United States Patent [19]

Biche

[11] 4,214,799

[45] Jul. 29, 1980

[54] MOVABLE AND PRE-WIRED WALL STRUCTURE

[75] Inventor: Barton A. Biche, Binghamton, N.Y.

[73] Assignee: Bunker Ramo Corporation, Oak Brook, Ill.

[21] Appl. No.: 62,655

[22] Filed: Aug. 1, 1979

Related U.S. Application Data

[63] Continuation of Ser. No. 929,585, Jul. 31, 1978, abandoned.

[51] Int. Cl.² ............................................. H02G 3/08
[52] U.S. Cl. ...................................... 339/20; 174/48; 339/4
[58] Field of Search ............................ 339/4, 20–24; 174/48

[56] References Cited

U.S. PATENT DOCUMENTS

| | | | |
|---|---|---|---|
| 2,563,909 | 8/1951 | Bauer | 339/20 |
| 3,651,443 | 3/1972 | Quilez | 339/20 |
| 3,820,057 | 6/1974 | Joly | 339/22 B |
| 4,009,920 | 3/1977 | Hicks, Jr. et al. | 339/22 B |
| 4,043,626 | 8/1977 | Propst et al. | 339/23 |
| 4,060,294 | 11/1977 | Haworth et al. | 339/4 |

*Primary Examiner*—Neil Abrams

*Attorney, Agent, or Firm*—F. M. Arbuckle; T. G. Scavone

[57] ABSTRACT

A feed-through connector is disclosed which allows the interconnection of adjoining electrical circuit modules, such as prewired wall panels, in any one of a variety of angular orientations. The feed-through connector is extremely simple in construction which facilitates its fabrication and assembly and minimizes its cost of manufacture. In addition, it can be conveniently incorporated into the vertical support members used in portable wall structures in such a manner as to increase the number of panels which may be assembled to a single support member and to optimize the variety of configurations in which the panels may be disposed. The connector includes a dielectric housing having at least one recess around its periphery and at least one conductive plate mounted within the recess, the recess and plate together forming a connector receptacle. The recess provides access to the conductive plate such that the contact elements of at least two modules can electrically engage the conductive plate. In this manner the modules may be electrically coupled while being physically arranged about the connector at any one of a variety of different angular orientations.

5 Claims, 6 Drawing Figures

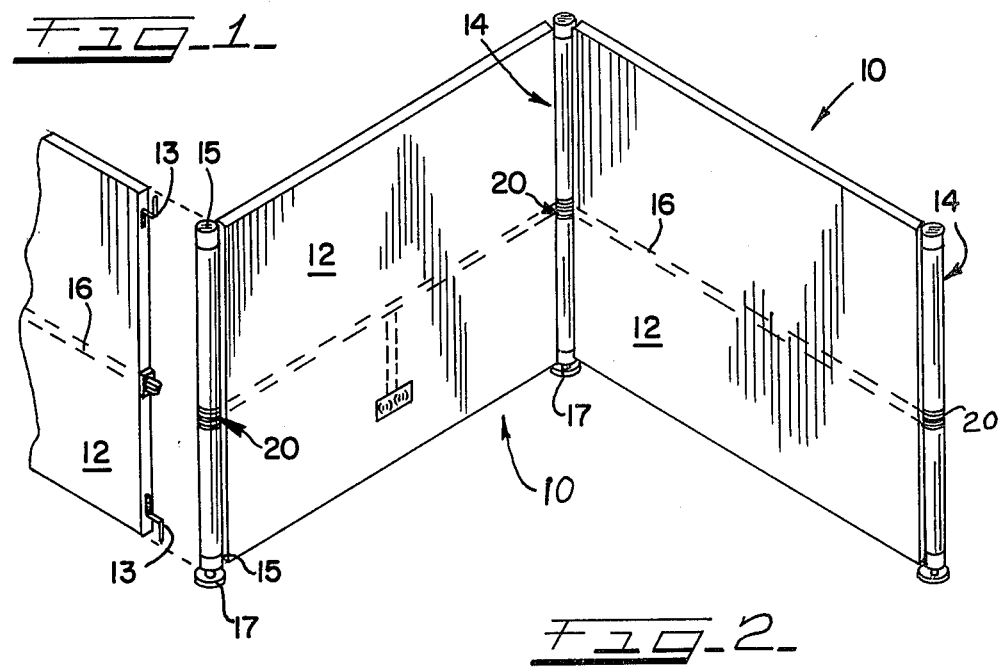
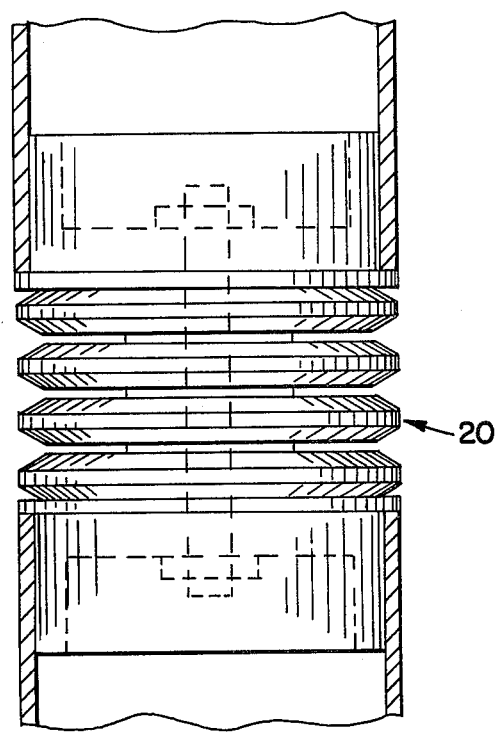

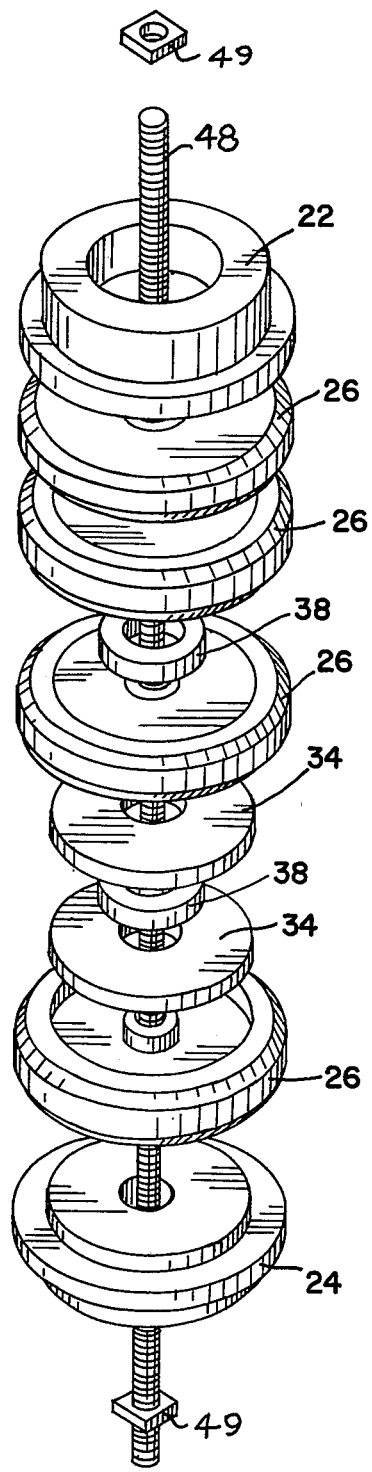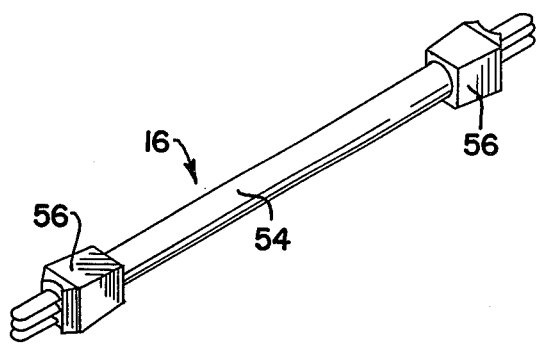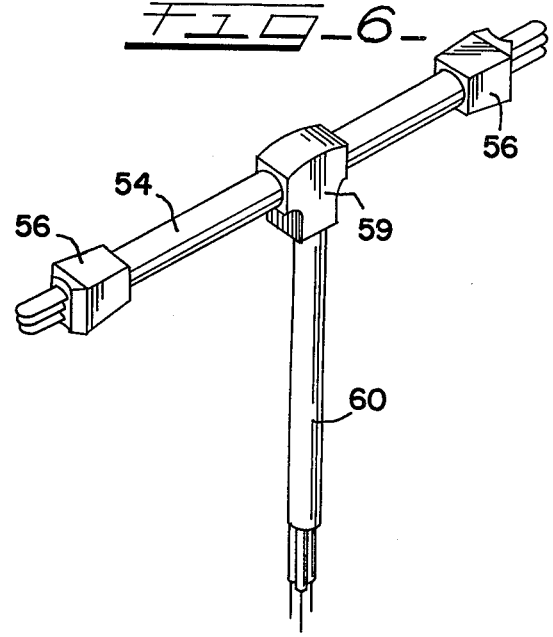

MOVABLE AND PRE-WIRED WALL STRUCTURE

This is a continuation, application of application Ser. No. 929,585, filed July 31, 1978 now abandoned.

BACKGROUND OF THE INVENTION

The present invention relates generally to feed-through electrical connectors and, more particularly to prefabricated wall or space dividing structures which include such connectors and are prewired to provide electrical service to the areas bounded by the structures.

Wall structures formed from a plurality of prefabricated panels have been used extensively in recent years and are gaining in popularity, particularly for use in offices where it is desirable to divide a large common area into numerous individual working stations. These wall structures are gaining wide acceptance because they are relatively inexpensive, are easily installed and may be easily rearranged to provide different work station configurations.

One problem associated with certain prefabricated wall structures in use today is the difficulty in supplying electrical service to the various working areas. If the electrical service is not incorporated in the panels and wall structure itself, a great deal of time and expense can be incurred in wiring the various working stations either during or after assembly of the structures. This, of course, diminishes greatly their value and advantage. To meet this problem a variety of prewired wall structures have been developed in which the electrical power lines and other necessary electrical services are carried through the individual prefabricated panels and are electrically coupled by connectors of one kind or another at the adjoining lateral edges of the panels. An example of one such prior art prewired wall system is disclosed in U.S. Pat. No. 4,060,294. While these prewired systems exhibit greater utility and are more efficacious than earlier wall structures requiring separate wiring, they nonetheless suffer from the disadvantage of being structurally complex, thereby increasing greatly their cost of manufacture. In addition, conventional feed-through connectors used to electrically couple adjacent panels in these structures limit the variety of physical arrangements in which the panels may be assembled. For example, typically only two or possibly three panels can be assembled to an individual support member and the angular orientation between the panels is limited to some predetermined range by the type of feed-through connector employed. Moreover, the prior art feed-through connectors are typically mated with the adjoining prewired panels independently of the mechanical engagement between the panel and the associated support members. This arrangement requires that in addition to the mechanical assembly of the wall structure, it is necessary to electrically couple the feed-through connectors with their respective panels. Thus, more time is required to assemble and disassemble the wall structure and, more importantly, it is possible to inadvertently unmate the connectors from the wall panels.

SUMMARY OF THE INVENTION

The present invention is directed to a novel feed-through connector which may be used in association with prewired wall structures to overcome the disadvantages associated with prior art structures of this type. More specifically, the invention is directed to a feed-through connector which allows the interconnection of adjoining electrical circuit modules, such as prewired wall panels, in any one of a variety of angular orientations. The feed-through connector is extremely simple in construction which facilitates its fabrication and assembly and minimizes its cost of manufacture. In addition, it can be conveniently incorporated into the vertical support members used in portable wall structures in such a manner as to increase the number of panels which may be assembled to a single support member and to optimize the variety of configurations in which the panels may be disposed.

The invention is also directed to a wall structure employing prewired wall panels which are both mechanically and electrically coupled to an adjoining support member in a single operation and which can be rotated about the support member without mechanically or electrically disengaging the panel from the support member. Because of the construction of the feed-through connector and its manner of engagement with the prewired wall panel, the electrical circuitry of the wall structure cannot be interrupted without first disassembling the panel from the support member. Thus, inadvertent unmating of the feed-through connector and the prewired panels is obviated.

More specifically, the present invention is directed to a feed-through connector for electrically coupling a plurality of electrical circuit modules, such as prewired wall panels, wherein the modules have at least one projecting contact element. The feed-through connector includes a dielectric housing having at least one recess around its periphery and at least one conductive plate mounted within the recess, the recess and plate together forming a connector receptacle. The recess provides access to the conductive plate such that the contact elements of at least two modules can electrically engage the conductive plate. In this manner the modules may be electrically coupled while being physically arranged about the connector at any one of a variety of different angular orientations.

The invention is also directed to a moveable wall structure comprising at least two prefabricated wall panels, an elongated vertical support member, means for mechanically securing the wall panels to the support member and a feed-through connector for electrically coupling adjacent panels. The prefabricated wall panels each carry at least one electrical conductor that terminates in an electrical contact element projecting from a lateral edge of the panel, and the panel securing means is adapted to mechanically affix two or more panels to a single support member in any one of a variety of angular orientations with the support member positioned adjacent the lateral edges of the panels. The feed-through connector is incorporated into the vertical support member and occupies a longitudinal portion of the member. The connector includes a dielectric housing having a recess around its periphery and at least one conductive plate mounted within the recess. When the panels are mechanically secured to the support member their respective contact elements project into the peripheral recess of the connector and engage the conductive plate thereby electrically coupling adjacent panels regardless of their angular orientation.

BRIEF DESCRIPTION OF THE DRAWINGS

The novel features which are believed to be characteristic of the invention are set forth in the appended claims. The invention itself, however, together with further objects and attendant advantages thereof, will be best understood by reference to the following description taken in connection with the accompanying drawings in which:

FIG. 1 is a perspective view illustrating a wall structure embodying the features of the present invention including a novel and improved feed-through electrical connector incorporated into the vertical support members of the structure;

FIG. 2 is an enlarged side elevation illustrating the feed-through connector of the present invention in assembled relation with a portable wall structure support member;

FIG. 4 is an exploded perspective view illustrating in greater detail the structure and relationship of the individual components of the feed-through connector; and FIGS. 5 & 6 are perspective views illustrating preferred embodiments for the electrical conductors carried by the panels and also illustrating a preferred plug connector with projecting contact elements.

DETAILED DESCRIPTION OF THE INVENTION

Figure 3:
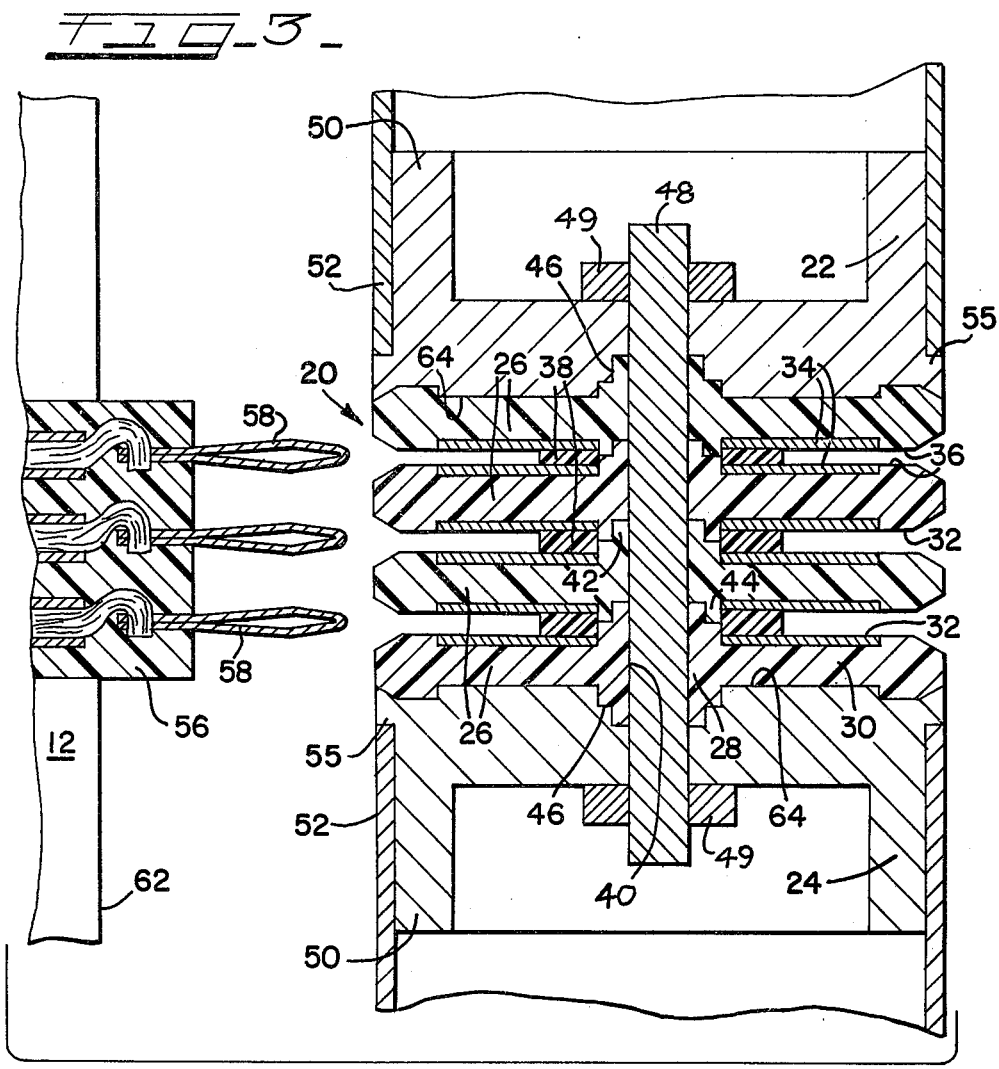
FIG. 3 is an enlarged cross-sectional view similar to that of FIG. 2 and further illustrating the relationship between the support member, the feed-through connector and the projecting contact elements of an adjacent prewired wall panel.

Referring now to FIG. 1, a wall structure designated generally as 10 is illustrated having a plurality of prefabricated and prewired wall panels 12 affixed to vertical support members 14. The panels 12 carry one or more electrical conductors 16 that extend horizontally between opposed lateral edges of the panels and terminate in projecting electrical contacts. The panels 12 and support members 14 are conventional in most respects and can be manufactured in accordance with a number of well known construction techniques and from a variety of different materials also well known in the art. Preferably, the means employed for mechanically securing the panels to the support members allow free rotation of the panels around the support members. For example, the panels 12 may include outwardly extending flanges or clips 13 which are retained by top and bottom caps 15. In addition, conventional threaded pads 17 can be used to properly level the panels.

In accordance with the present invention, each of the support members also includes a feed-through connector 20 which electrically couples the conductors 16 of adjoining panels. FIGS. 2, 3 and 4 illustrate in greater detail the specific structural features of the feed-through connector 20 and its relationship with the other components of the wall structure 10. The connector 20 includes a dielectric housing having first and second end caps 22 and 24, respectively, and a plurality of dielectric inserts 26 stacked between the end caps. Each of the inserts 26 includes a central hub portion 28 and an outer circumferential portion 30. The hub and outer portions of the inserts are dimensioned such that the hub portions 28 of each insert mate with the hub portions of adjacent inserts while the outer circumferential portions 30 are spaced from one another thereby forming recesses 32 which extend about the periphery of the connector. The connector 20 also includes at least one electrically conductive plate 34 mounted within each recess 32, the conductive plates 34 each establishing a continual electrical path about the perimeter or circumference of the connector. Preferably, a pair of conductive plates 34 are mounted in the opposing side walls 36 of each recess 32, the conductive plates being separated by spacers 38. Each of the end caps and individual inserts includes a centeral aperture which together define a central housing passageway 40.

As is most clearly illustrated in FIG. 3, each of the inserts 26 is identically configured and includes an inner hub collar 42 on one side and an outer hub collar 44 on its other side. The hub collars 42 and 44 of each insert coact with the hub collars of adjacent inserts and the stepped annular recesses 46 in the end caps to provide means for axially aligning the individual components of the connector housing. Once the end caps, inserts, conductive plates and spacers have been properly assembled, a bolt 48 and nuts 49 or other conventional fastening means may be employed to hold the assembly together.

The feed-through connector 20 when employed as a component in wall structure 10, includes means for incorporating the connector into the vertical support members 14. In accordance with a preferred embodiment of the invention, the end caps 22 and 24 are provided with sleeves 50, each of the sleeves having a size and configuration to telescopically engage the tubular wall 52 of the support member 14. The end caps 22 and 24 also include an annular flange 55 which provides a positive stop to insure that the connector 20 is properly located on the support member 14.

The electrical conductors carried by the wall panels 12 may be constructed in any one of a number of different manners well known to those skilled in the art. One technique found to be particularly suitable for use in prefabricated wall panels is illustrated in FIGS. 5 and 6. These cable assemblies are fabricated by terminating suitable electrical contacts to the individual conductors at each end of the cable and subsequently insert molding a solid dielectric housing over the terminal portion of the contacts and a short portion of the cable to completely encapsulate the exposed conductors. Thus, the electrical conductor assembly 16 shown in FIG. 5 comprises a multiconductor cable 54 having premolded plug connectors 56 with projecting contact elements 58 at each end. Similarly, FIG. 6 shows another electrical conductor assembly 16 having a splice junction 59 which is also encapsulated in a solid dielectric plastic. A tap line 60 extends from the junction 59 to provide electrical service at any required location on the panel 12.

As is evident from FIGS. 1 and 3, the plug connectors 56 are mounted adjacent the lateral edge 62 of panel 12 with the contact elements 58 extending therefrom. When the panel 12 is mounted to the support member 14 the contacts 58 are received into the annular recess 32 of the connector 20 and electrically engage the conductive plates 34. So long as the panels 12 are mechanically secured to the support members 14 the contacts 58 cannot disengage from the connector 20. Moreover, since the annular recess 32 extends around the entire periphery of the connector 20, the panel 12 can be mounted in any position through the full 360° of rotation around the support member. Similarly, the continuity of the peripheral recess 32 and the conductive plates 34 also allows assembly of an unlimited number of panels to a single support, the physical size of the panels 12 and plugs 58 relative to the support member 14 being the only limiting factor.

It will be appreciated by those skilled in the art that the feed-through connector of the present invention is of a simple construction which is readily adaptable to low cost mass production techniques. For example, the end caps 22 and 24 are identically configured and can be conveniently and expeditiously fabricated by injection molding any of a number of well known heat resistant and dielectric plastics. Likewise, the inserts 26 are identically configured, as are the spacers 38, and these may also be injection molded from the same or similar plastics used in fabrication of the end caps. Of course the spacers 38 may be manufactured from conductive materials as well, but they are most economically and expeditiously made through conventional plastic molding techniques. The conductive plates 34 can be stamped from metal sheet stock, preferably a metal exhibiting a high conductivity such as brass.

Of course, the dimensions of the various feed-through connector components must be set to accept the contacts 58 of a given plug connector. Preferably, the plug connectors will have uniform dimensions such that each of the panels in a given system may be connected to any support member 14.

Those skilled in the art will also appreciate that the feed-through connector illustrated in the preferred embodiments does not extend beyond the lateral surfaces of the support member 14, and therefore does not impede or interfere with the mounting or rotation of the panels 12 on the support members 14. In order to facilitate insertion on the contacts 58 into the annular recesses 32, the extremities of the inserts 26 are beveled to provide lead-in entryways to the recesses, and the conductive plates 34 are mounted in the opposing side walls 36 of the recesses such that their external contact engaging surfaces are flush and even with the surface of the side walls. The plates 34 also terminate well within recess 32 to reduce the possibility of inadvertent electrical shock. In order to provide further alignment means to assure proper assembly of the connector housing components, the inside surfaces 64 of the end caps are configured to mate with the outer surfaces of the outer most inserts.

It should be understood that various changes and modifications of the present invention as described herein will be apparent to those skilled in the art. Such changes and modifications can be made without departing from the spirit and scope of the present invention and without diminishing its attendant advantages. For example, although the feed-through connector 20 has been illustrated as being generally cylindrical, the connector could easily be constructed to have a different external configuration particularly in those instances where the support member with which it is mounted has some other cross-section shape. Moreover, although the preferred embodiment shows a single feed-through connector associated with each support member 14, two or more of the connectors may be used whenever the associated wall panels include a plurality of spaced conductors of common or different suervice functions. Likewise, the invention is not limited to the three line circuitry illustrated, but may be used with one, two or multi-line circuits. In fact, one of the distinct advantages of the present invention is the fact that regardless of the number of lines in the circuit serviced by the connector, the same components are used, the specific number of inserts, conductive plates and spacers for the given connector depending on the number of receptacle recesses required to accommodate the particular circuitry. It is, therefore, intended that all such changes and modifications be covered by the following claims.

I claim:

1. A movable wall structure comprising:
   at least two prefabricated wall panels each having at least one integrally assembled electrical conductor terminating in an electrical contact element projecting from a lateral edge of the panel;
   an elongated vertical support member;
   means disposed adjacent the ends of the lateral edges of said wall panels for mechanically securing said panels to said support member in any one of a variety of angular orientations with said support member positioned adjacent said lateral edges of said panels, said mechanical securing means cooperating with securement elements disposed adjacent the ends of said support member; and
   a feed-through connector mounted within said support member intermediate said securement elements and including a dielectric housing having a recess around its periphery and at least one conductive plate mounted within said recess, said housing having means for mounting said connector in telescopic engagement within said support member, said recess providing access to said conductive plate to electrically engage the contact elements of said wall panels, whereby the electrical conductors of said wall panels may be electrically coupled with said wall panels in any one of said variety of angular orientations;
   said panel securing means and support member securement elements providing for rotation of said wall panels about said support member while maintaining said panels and said support member in mechanical engagement and while maintaining electrical circuit continuity between the panel contact elements and the connector plates.

2. The wall structure of claim 1 wherein said connector housing includes first and second end caps, at least two dielectric inserts stacked between said end caps and having mating hub portions and spaced outer circumferential portions defining said recess therebetween, and means for maintaining said end caps and stacked inserts in axial alignment.

3. The wall structure of claim 1 wherein two or more feed-through connectors are incorporated in said support member to accommodate a plurality of electrical conductors carried by said wall panels.

4. The wall structure of claim 1 wherein said feed-through connector includes two conductive plates mounted in opposing sidewalls of said recess and a spacer disposed between said plates.

5. The wall structure of claim 1 wherein said feed-through connector does extend beyond the lateral surfaces of the support member.

* * * * *